United States Patent
Lu et al.

(10) Patent No.: US 6,452,787 B1
(45) Date of Patent: Sep. 17, 2002

(54) ENGAGING AND EJECTING DEVICE FOR EXPANSION MODULE/CELL OF PORTABLE COMPUTER

(75) Inventors: Yu-Kun Lu; Chuan-Yuan Lee; Yu-Tsai Chang; Chia-Ling Wu, all of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/414,564

(22) Filed: Oct. 8, 1999

(51) Int. Cl.⁷ .............................. H05K 7/10; G06F 1/16
(52) U.S. Cl. ..................... 361/683; 361/684; 361/727
(58) Field of Search ........................... 713/1; 361/600, 361/679, 683–685, 724–733

(56) References Cited

U.S. PATENT DOCUMENTS

| | | | |
|---|---|---|---|
| 5,393,241 A | * | 2/1995 | Honda et al. ............... 439/248 |
| 5,507,661 A | * | 4/1996 | Honda et al. ............... 439/347 |
| 5,598,318 A | * | 1/1997 | Dewitt et al. ............... 361/683 |
| 5,740,012 A | * | 4/1998 | Choi .......................... 361/686 |
| 5,971,780 A | * | 10/1999 | Youn .......................... 439/160 |
| 5,991,838 A | * | 11/1999 | Swindler et al. ............ 710/101 |
| 5,997,323 A | * | 12/1999 | Youn .......................... 439/159 |

* cited by examiner

Primary Examiner—Thomas M. Heckler
(74) Attorney, Agent, or Firm—Bacon & Thomas, PLLC

(57) ABSTRACT

An engaging and ejecting device for expansion module/cell of portable computer, including a control member and a switch member pivotally disposed on one side of a housing of the portable computer. The control member and the switch member drivingly cooperate with each other. One side of the expansion module is disposed with a block body. After the module is inserted into the portable computer housing, the control member, switch member and control block drivingly cooperate with each other to engage the module inside the computer housing. When the switch member is pushed outward, the module is ejected out of the computer housing.

4 Claims, 5 Drawing Sheets

ENGAGING AND EJECTING DEVICE FOR EXPANSION MODULE/CELL OF PORTABLE COMPUTER

BACKGROUND OF THE INVENTION

The present invention relates to an engaging and ejecting device for expansion module/cell of portable computer, and more particularly to an engaging and ejecting device which is able to conveniently engage the expansion module with the portable computer or eject the expansion module out of the portable computer.

A conventional portable computer is equipped with extractable CD ROM or disc drive module. The extractable CD ROM or disc drive module is connected with the portable computer via a connector. When drawing the CD ROM or disc drive module from the portable computer, it is quite laborious and difficult to directly extract the CD ROM or disc drive module.

In addition, the conventional engaging structure for engaging the disc drive module inside the portable computer is composed of complicated components. Therefore, it is troublesome to manufacture and assemble these components.

SUMMARY OF THE INVENTION

It is therefore a primary object of the present invention to provide an engaging and ejecting device for expansion module/cell of portable computer. The engaging and ejecting device is not only able to firmly engage the expansion module inside the computer housing, but also able to conveniently and easily eject the expansion module out of the portable computer.

The present invention can be best understood through the following description and accompanying drawings wherein:

DETAILED DESCRIPTION OF THE PREFERRED EMBODIMENT

Figure 1:
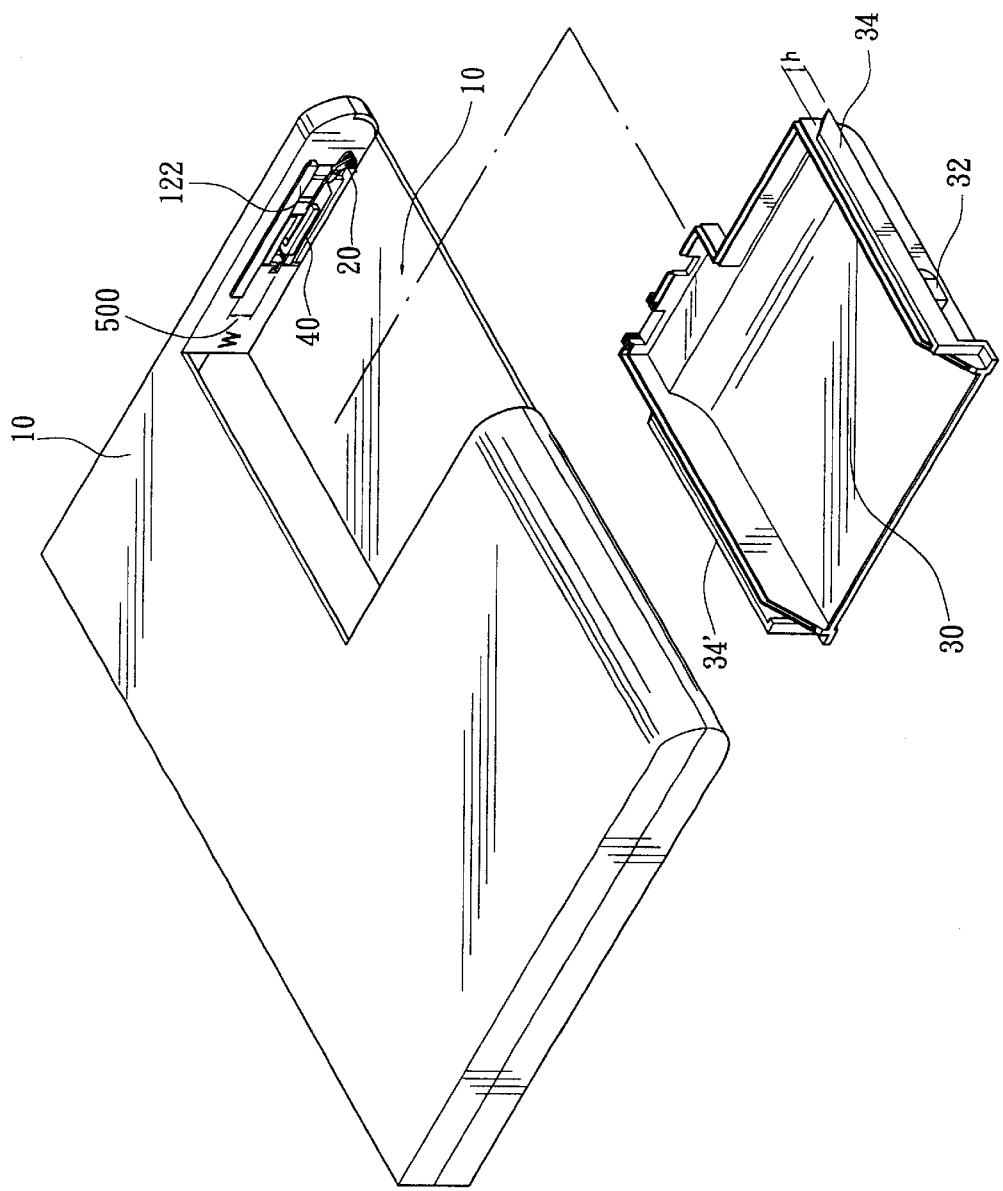
FIG. 1 is a perspective view of the portable computer housing and expansion module housing of the present invention.

Please refer to FIG. 1. The present invention includes a control member 20 and a switch member 40 pivotally disposed on one side of a receiving chamber of the portable computer housing 10. In addition, a control block 32 is disposed on one side of the module housing 30 in which a disc drive or a CD ROM (not shown) is installed to form an expansion module.

Figure 2:
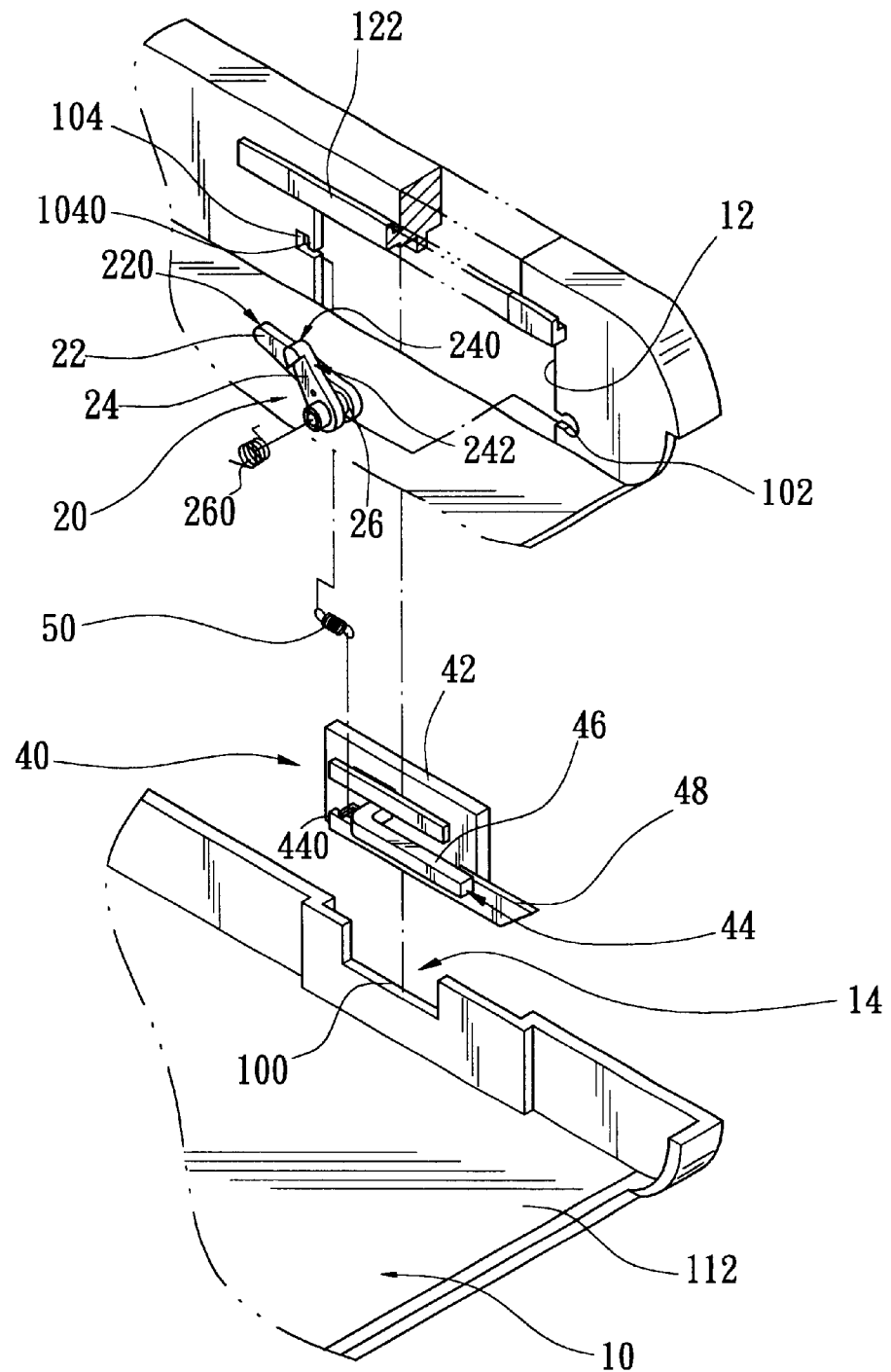
FIG. 2 is a perspective exploded view of the control member, switch member and a part of the computer housing of the present invention.

Referring to FIG. 2 which is an exploded view of the control member 20, switch member 40 and a part of the computer housing 10. One side of the housing 10 is formed with a first U-shaped recess 12. Two sides of the first recess 12 are respectively formed with two pivot holes 102, 104. The housing 10 is further formed with a second U-shaped recess 14 on lower side of the first recess 12.

The switch member 40 is disposed with a sliding body 42. One side of the sliding body 42 is disposed with a pivot section 44, an engaging block 46 and a pushing block 48. In this embodiment, the pivot section 44 is a groove formed between the sliding body 42 and the pushing block 48.

The switch member 40 via the pivot section 44 is fitted with a lateral edge 100 of the housing adjacent to the second U-shaped recess 14, whereby the switch member 40 can be pushed to slide along the surface of the lateral edge 100.

The pushing block 48 of the switch member 40 is formed with a fixing hole 440 on an inner side adjacent to the housing 10. One end of a second resilient member 50 is passed through the fixing hole 440 and wound around the pushing block 48. The other end of the second resilient member 50 is fixed on a fixing post 1040 on one side of the pivot hole 104. The second resilient member 50 provides a restoring force for moving the switch member 40 on the housing 10.

Please refer to FIG. 2. The control member 20 is disposed with a first control body 22, a second control body 24 and a pivot shaft 26. The pivot shaft 26 is passed through and fixed with the first and second control bodies 22, 24.

Figure 4:
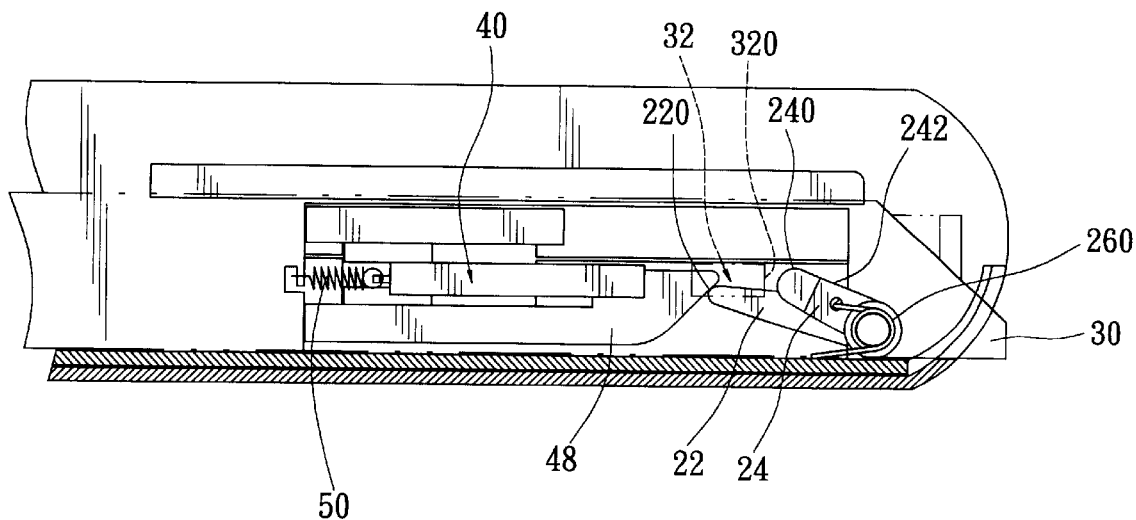
FIG. 4 shows the operation of the portable computer and the expansion module of the present invention in one state.

Referring to FIGS. 2 and 4, the pivot shaft 26 of the control member 20 between the first and second control bodies 22, 24 is fitted into the pivot hole 102 adjacent to front side of the housing 10, whereby the control member 20 can be rotated about the pivot shaft 26. The free end of the first control body 22 is disposed with a first control face 220. The free end of the second control body 24 is disposed with a second control face 240. The second control body 24 is further disposed with a third control face 242 on upper side between the free end and the pivot shaft 26. In addition, a first resilient member 260 is disposed between the pivot shaft 26 protruding out of the second control body 24 and the bottom face 1001 of the housing. The first resilient member 260 provides a restoring force for the control member 20 when forced and rotated about the pivot hole 102.

Figure 3:
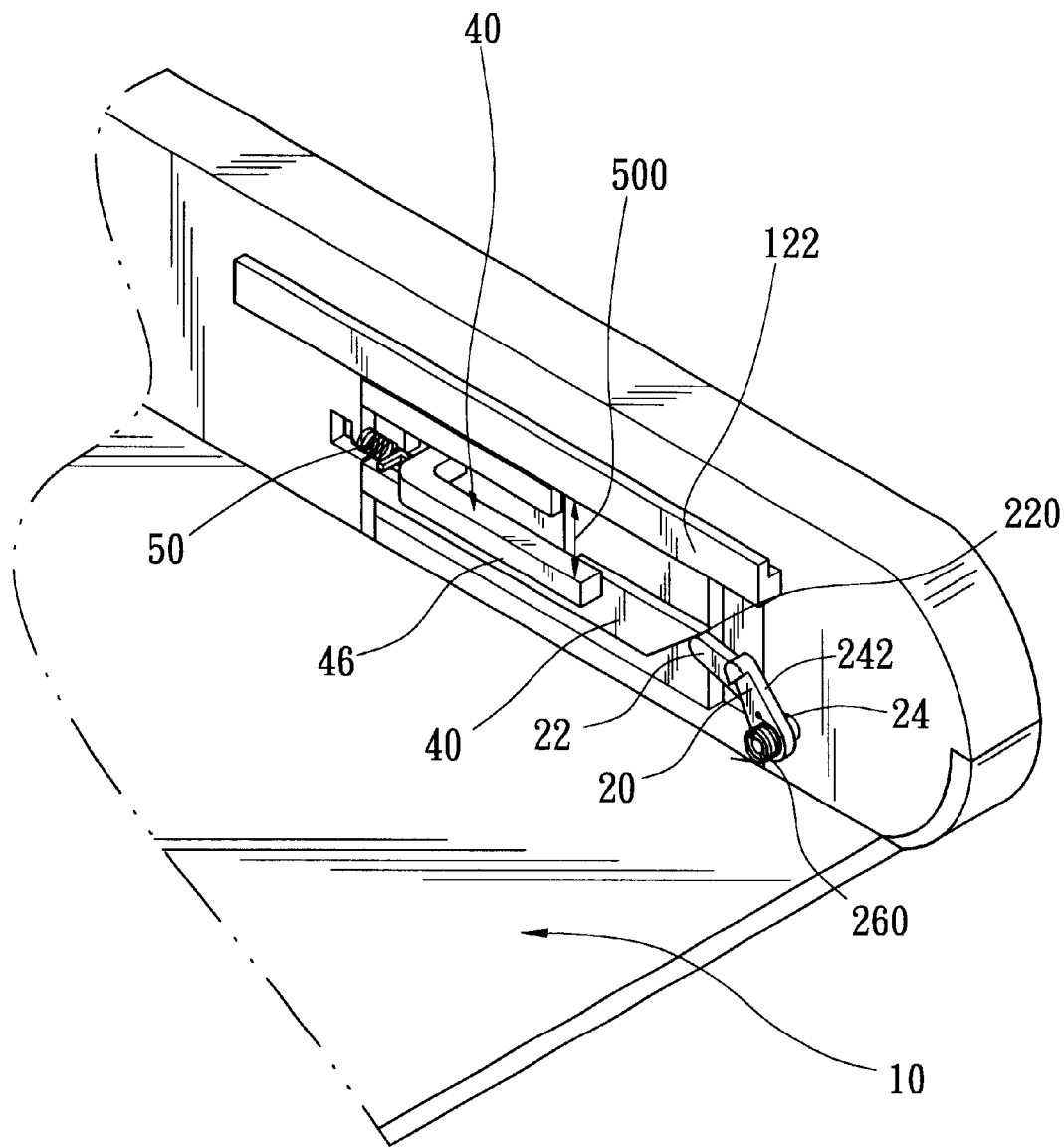
FIG. 3 is a perspective assembled view of the computer housing and the control member of the present invention.

Please refer to FIGS. 1 to 3. The housing 10 is formed with a rail 122 on upper side of the first U-shaped recess 12. The rail 122 and the engaging block 46 of the switch member 40 define a slide slot 500, Referring to FIG. 1, the module housing 30 is disposed with a projecting rail 34 above the control block 32. The height h of the projecting rail 34 is slightly less than the width w of the slide slot 500. The other side of the module housing 30 opposite to the control block 32 is also disposed with a projecting rail 34'. One side of the housing 10 is disposed with a slide slot (not shown) corresponding to the projecting rail 34'. The module housing 30 in which a disc drive is installed can be inserted into the housing 10 with the projecting rails 34, 34' sliding within the slide slots 500 of two sides of the housing 10.

Referring to FIG. 3, prior to installation of the module into the housing 10, the lateral edge of the pushing block 48 of the switch member 40 just contacts with the first control face 220 of the first control body 22 of the control member 20. Also, the second resilient member 50 fixes the switch member 30 on inner side of the housing 10.

Referring to FIGS. 1 and 3, when a user pushes the module into the housing 10, the bottom of the module presses the first control face 220 of the first control body 22, whereby the module can be successfully inserted into the housing 10 with the projecting rails 34, 34' sliding within the slide slots 500 of two sides of the housing 10.

Referring to FIG. 4, when the module is totally pushed into the housing 10, the control block 32 on one side of the module passes through the control member 20. The first resilient member 260 disposed between the control member 20 and the bottom 112 of the housing 10 provides a restoring force to bound the control member 20 back to its home position. At this time, the second control face 240 of the free end of the second control body 24 cooperates with the outer lateral edge 320 of the control block 32 so as to securely locate the module inside the housing 10.

Figure 5:
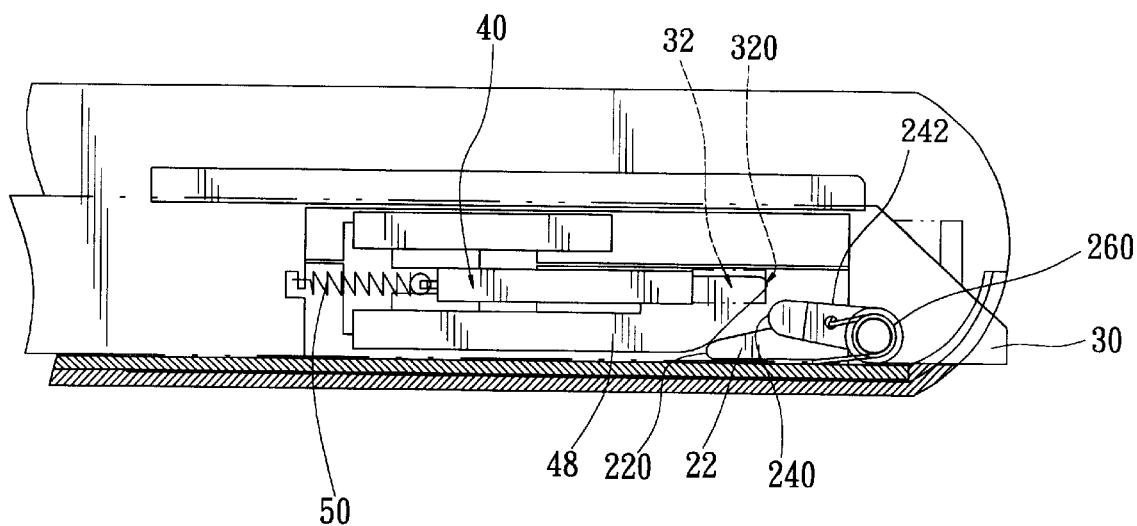
FIG. 5 shows the operation of the portable computer and the expansion module of the present invention in another state.
Figure 6:
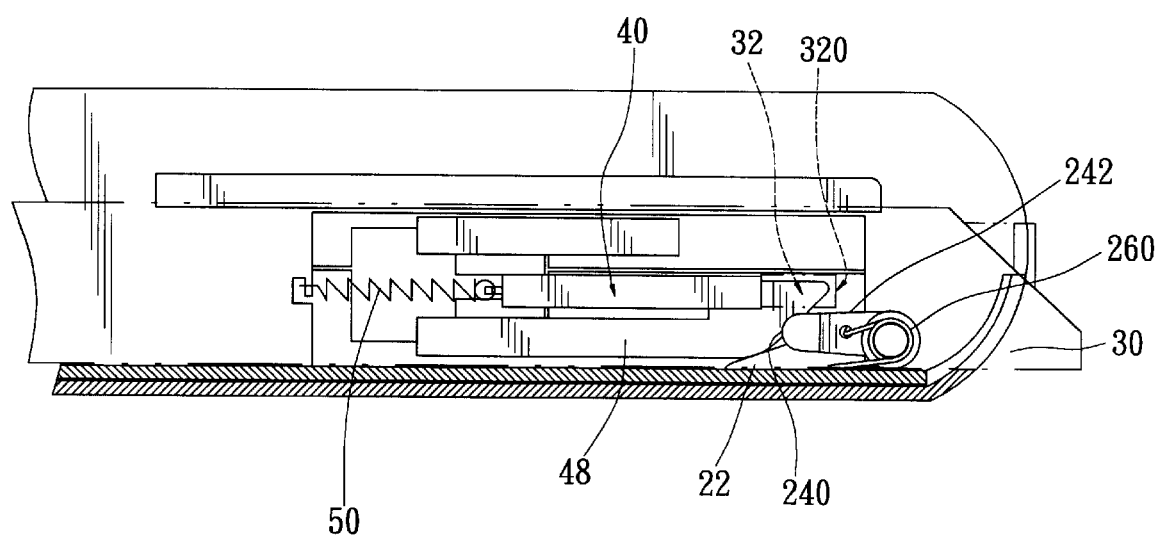
FIG. 6 shows the operation of the portable computer and the expansion module of the present invention in still another state.

Referring to FIG. 5, when the user wants to take out the module from the housing 10, the user pushes the sliding body 42 of the switch member 40 in an outward direction. As shown in FIG. 6, the pushing block 48 presses the first control face 220 of the first control body 22 to make the control member 20 rotate toward the bottom 112 of the housing 10. At this time, the second control face 240 of the free end of the second control body 24 does not correspond to the outer lateral edge 320 of the control block 32, permitting the module housing to be ejected out of the housing 10. When the module housing is taken out from the housing 10, the first resilient member 260 bounds and restores the control member 20 back to its home position. In addition, the second resilient member 50 further pulls the switch member 30 back into the inner side of the housing 10. The user can then repeatedly operate the module and re-insert the module into the housing 10.

The above embodiment is only used to illustrate the present invention, not intended to limit the scope thereof. Many modifications of the above embodiment can be made without departing from the spirit of the present invention.

What is claimed is:

1. An engaging and ejecting device for expansion module/cell of portable computer, comprising:

a control member pivotally disposed on a lateral edge of a housing of the portable computer, the control member being disposed with a first and a second control bodies which are coaxially inter-drivingly arranged, the first control body being disposed with a first force application face, the second control body being disposed with a second force application face, the force application direction of the first force application face being directed to outer side of the computer housing, while the force application direction of the second force application face being directed to inner side of the computer housing;

a first resilient member one end of which is fixed at the control member, while the other end of which is in contact with the computer housing;

a switch member pivotally disposed on a lateral edge of the computer housing and disposed with a sliding body, one side of the sliding body being disposed with a pivot section, a pushing block and an engaging block, the switch member being back and forth movable relative to the lateral edge of the computer housing; and an expansion module for inserting into the computer housing, the expansion module being disposed with a control block on one side corresponding to the control member, whereby when the expansion module is inserted into the computer housing, the control block contacts with the first force application face of the first control body, when the module is totally inserted into the receiving chamber of the portable computer, the control member being restored to its home position by resilient member, at this time, the control block being positioned between the first force application face of the control member and the engaging section of the switch member and the module is in an engaged state, when it is desired to eject the module out of the portable computer, the sliding body being pushed outward, at this time, the pushing section of the switch member pushing the second force application face of the second control body, making the second control body move downward relative to the portable computer, the first control body being driven by the second control body and the first control end edge being disengaged from the control block, permitting the module to be ejected out of the portable computer.

2. An engaging and ejecting device as claimed in claim 1, wherein the pivot section is a slide slot.

3. An engaging and ejecting device as claimed in claim 1, wherein a second resilient member is disposed between the lateral end of the switch member and the computer housing, whereby when the module is ejected out of the computer housing, the second resilient member pulls the switch member back to its home position for re-inserting the module into the housing.

4. An engaging and ejecting device as claimed in claim 1, wherein a pivot shaft is disposed between the first and second control bodies for protecting the rotary shaft.

* * * * *